United States Patent [19]

Matsui et al.

[11] Patent Number: 4,774,461

[45] Date of Patent: Sep. 27, 1988

[54] SYSTEM FOR INSPECTING EXPOSURE PATTERN DATA OF SEMICONDUCTOR INTEGRATED CIRCUIT DEVICE

[75] Inventors: Shogo Matsui, Sagamihara; Kunihiko Shiozawa, Yokohama; Kenichi Kobayashi, Tokyo, all of Japan

[73] Assignee: Fujitsu Limited, Kawasaki, Japan

[21] Appl. No.: 934,788

[22] Filed: Nov. 25, 1986

[30] Foreign Application Priority Data

Nov. 25, 1985 [JP] Japan .................. 60-262460

[51] Int. Cl.[4] ............................................. G01R 31/02
[52] U.S. Cl. ........................... 324/158 R; 324/73 PC; 356/394
[58] Field of Search ............ 324/158 R, 73 PC, 73 R; 356/392, 394; 358/101, 106; 382/8, 34

[56] References Cited

U.S. PATENT DOCUMENTS

| | | | |
|---|---|---|---|
| 4,148,065 | 4/1979 | Nakagawa | 358/101 |
| 4,259,020 | 3/1981 | Babb | 356/243 |
| 4,450,579 | 5/1984 | Nakashima et al. | 382/8 |
| 4,479,145 | 10/1984 | Azuma et al. | 358/101 |
| 4,498,778 | 2/1985 | White | 356/243 |
| 4,509,075 | 4/1985 | Simms et al. | 358/106 |
| 4,532,650 | 7/1985 | Wihl et al. | 358/101 |
| 4,609,939 | 9/1986 | Kozawa et al. | 358/101 |
| 4,614,430 | 9/1986 | Hara et al. | 382/8 |

FOREIGN PATENT DOCUMENTS

| | | | |
|---|---|---|---|
| 0052728 | 3/1985 | Japan | 358/106 |
| 0048579 | 3/1985 | Japan | 382/8 |

Primary Examiner—Reinhard J. Eisenzopf
Assistant Examiner—W. Burns
Attorney, Agent, or Firm—Staas & Halsey

[57] ABSTRACT

A system for inspecting exposure pattern data in the form of coordinate data for forming a reticle of a semiconductor integrated circuit device, on the basis of video signals. The inspection system includes a unit for inputting exposure pattern data in the form of coordinate data form in response to a request for a test region, converting the input exposure pattern data to data corresponding to an actual pattern in a two-dimensional form, storing the converted data, and outputting the stored data in the form of video signals; a unit for testing the exposure pattern data from the inputting and converting unit on the basis of the video signals under a predetermined pattern rule; and a unit for outputting data tested at the pattern testing unit. The pattern test unit includes a variety of test circuits, such as a slit test circuit, a comparator, a combination circuit, etc., used for a pattern test.

22 Claims, 13 Drawing Sheets

OR

AND

EXCLUSIVE-OR

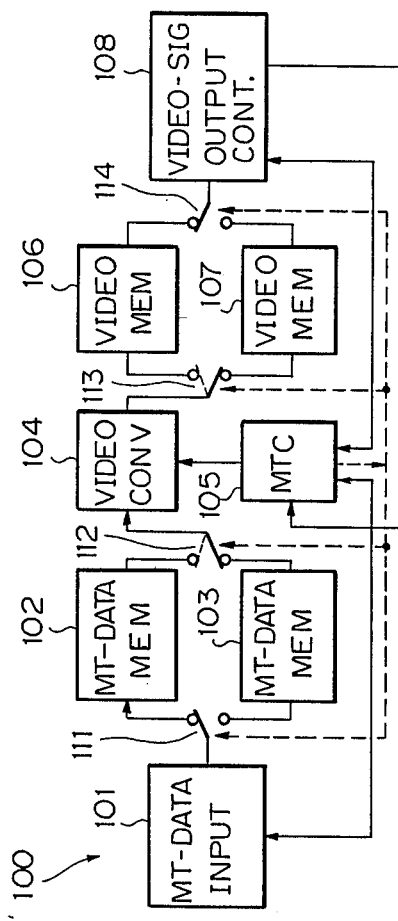

Fig. 9e

Fig.14a  Fig.14b  Fig.14c
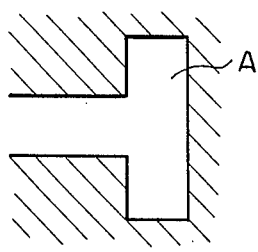 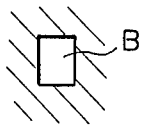 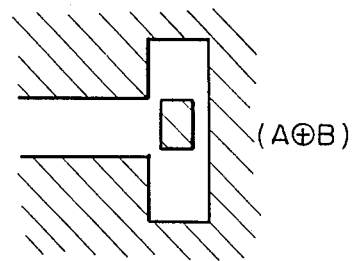
Fig.14d  Fig.14e
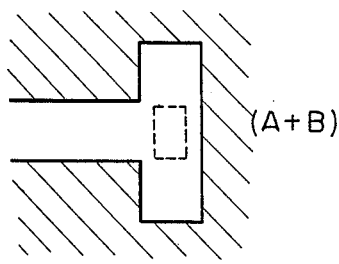 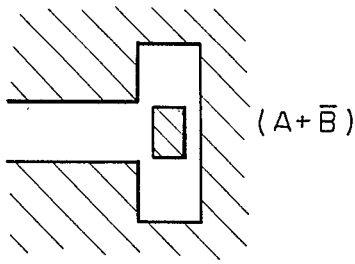
Fig.14f  Fig.14g
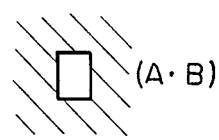 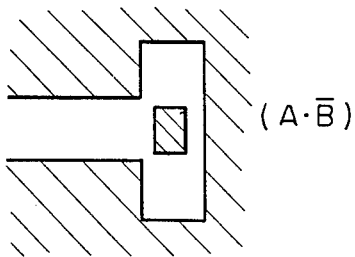

SYSTEM FOR INSPECTING EXPOSURE PATTERN DATA OF SEMICONDUCTOR INTEGRATED CIRCUIT DEVICE

BACKGROUND OF THE INVENTION

The present invention relates to a system for inspecting exposure pattern data of a semiconductor integrated circuit (IC) device. More particularly, it relates to a system for inspecting exposure pattern data of a semiconductor IC device on the basis of exposure pattern data in an image data form.

Semiconductor integrated circuits (ICs) are generally manufactured by the following steps: logic design; pattern design; mask manufacturing; wafer process for manufacturing wafers; cutting wafer and assembling IC. The pattern design step involves: logic translation; circuit design; circuit analysis; pattern layout design; characteristics analysis; and modification of a pattern layout. The mask manufacturing process includes the steps of: reading coordinates from pattern layout design drawings; displaying the coordinates on a cathode ray tube (CRT), or plotting the coordinates by a plotter; testing and modifying data of the coordinates on the CRT or plotted drawings; producing original patterns by means of a pattern generator; producing master masks by means of a photo-repeater; and making working masks.

Automation of the above pattern design has been achieved by utilizing a Computer Aided Design (CAD) system. Pattern layout data produced by the CAD system is stored in magnetic tapes on the basis of predetermined formats by, for example, the CV Corporation, CALMA Corporation, etc. The pattern layout data defines only outlines, and accordingly, prior to the production of reticle patterns by actual exposure, the pattern layout data must be data-translated to produce exposure data, and the exposure data must be carefully inspected.

Systems for inspecting the exposure data are widely known, and an exposure data inspecting system is generally realized by using a general-purpose computer system and a program, such as DRACULA, SPICE, etc. The conventional exposure data inspecting system provides visual exposure data in a two-dimensional form and is produced from the data of the coordination system having, for example, the CALMA format on the CRT or the pattern. The displayed exposure data can be visually inspected by the operator.

The conventional exposure data inspecting systems, however, suffer many disadvantages, such as a low data processing speed, and accordingly, a low inspection efficiency, limitations of inspecting functions, and poor inspection accuracy, etc. These disadvantages will be described later, in more detail, with reference to specific examples.

SUMMARY OF THE INVENTION

An object of the present invention is to provide a system for inspecting exposure pattern data of a semiconductor IC device, and having an improved data processing speed.

Another object of the present invention is to provide a system for inspecting exposure pattern data of a semiconductor IC device, the system a variety of functions required for inspection and adjustment.

Still another object of the present invention is to provide a system for inspecting exposure pattern data of a semiconductor IC device, the system having an improved inspection accuracy and reliability.

According to the present invention, there is provided a system for inspecting exposure pattern data for forming a reticle of a semiconductor integrated circuit device, including: a unit for inputting exposure pattern data having a coordinate data form, in response to a request for a test region, converting the input exposure pattern data, to data corresponding to an actual pattern in a two-dimensional form, storing the converted data and outputting the stored data in the form of video signals; a unit, operatively connected to the inputting and converting unit, for testing the exposure pattern data from the inputting and converting unit on the basis of the video signals under a predetermined pattern rule; and a unit, operatively connected to the pattern testing unit, for outputting data tested at the pattern testing unit.

The pattern test unit may include at least one slit test circuit for testing slits of the exposure pattern data in a designated section within the test region, with respect to a reference value, on the basis of the video signals.

The pattern test unit may also include at least one logic circuit for changing a state of the exposure pattern data in a designated section within the test region.

The inputting and converting unit may input exposure pattern data of a plurality of layers at a same test region: whereby the pattern tests unit testing patterns of the plurality of layers.

The inputting and converting unit may include two inputting and converting circuits operating independently of each other and having a same construction. One circuit being used for inputting exposure pattern data to be inspected, and the other circuit being used for inputting reference exposure pattern data to the inspection exposure pattern data.

The pattern test unit may include a circuit for comparing the exposure pattern data from the two inputting and converting circuits.

The pattern test unit may further include a logic circuit for changing at least one exposure pattern data from the two inputting and converting circuits, prior to the comparison of the data.

The pattern test unit may include a circuit combining the exposure pattern data from the two inputting and converting circuits.

The pattern test unit may further include a logic circuit for changing at least one exposure pattern data from the two inputting and converting circuits, prior to the combination of the data.

The inputting and converting unit may input the exposure pattern data with a predetermined data input resolution, whereby the pattern test unit effects the test by a resolution defined by the data input resolution.

On the other hand, the pattern test unit may effect the test by a predetermined designated resolution.

The inputting and converting unit may include dual data storing units for improving data input speed and data conversion speed.

BRIEF DESCRIPTION OF THE DRAWINGS

Other objects and features of the present invention will be described in detail with reference to the accompanying drawings, in which:

FIGS. 8a and 8b are circuit diagrams of an embodiment of an exposure pattern data inspection system of the present invention;

FIGS. 9a, 9b, 9c, 9d and 9e are graphs explaining the operation of a data input and signal translation unit shown in FIGS. 8a and 8b;

FIGS. 14a to 14g are views illustrating the logical change pattern test by the exposure pattern data inspection system shown in FIGS. 8a and 8b;

DETAILED DESCRIPTION OF THE PREFERRED EMBODIMENTS

Before describing the preferred embodiments of the present invention, concrete examples of the prior arts, and the disadvantages thereof, will be described to emphasize the features of the present invention.

Figure 1A:
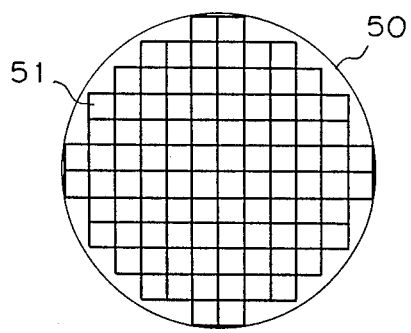
FIGS. 1a to 1c are explanatory views illustrating the production of the pattern layout data.
Figure 1B:
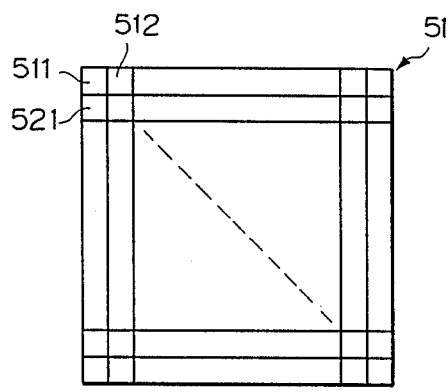

As is well known, a plurality of IC chips can be formed in a semiconductor wafer 50 as shown in FIG. 1a. Each IC chip has the same circuit construction, and thus is patterned in the same way. The patterning can be effected for a plurality of layers (for example, approximately twenty layers) on the semiconductor wafer 50, and thus pattern layout data for the plurality of layers is required. Each chip, for example, 51, may have a size of 10 mm × 10 mm and include several thousands of gates. The patterning must be performed with a high resolution, for example, 1 μm. As a result, an enormous amount of pattern layout data is required for even a single layer patterning. As mentioned earlier, the pattern layout data is produced by the CAD system and is temporarily stored in a magnetic tape(s). From the viewpoint of data handling standardization, the pattern layout data for a single layer is divided into a plurality of segments, each having a size of 1 mm × 1 mm as shown in FIG. 1b.

In addition, from the viewpoint of a reduction of the pattern layout data, the pattern layout data is produced in a coordination data form. For example, when patterning lines are arranged in a segment 511, as shown in FIG. 1c, the pattern layout data is coordination data of $(x_1, y_1)$, $(x_2, y_1)$, and $(x_2, y_2)$.

Figure 1C:
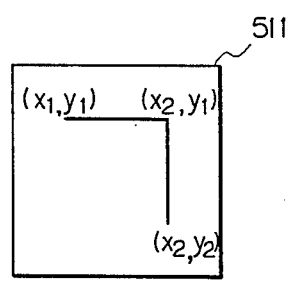

In the conventional exposure pattern data inspection system using a general purpose digital computer and a SPICE, etc., processing program, each segment pattern as shown in FIG. 1c is displayed on a CRT display at one time. Accordingly, a pattern rule check of a plurality of patterns in a segment, for example, a check of a distance d1 between a pattern A and another pattern B in the segment 511 in FIG. 2a, can be visually made at the CRT display. However, a check of a distance d2 between a pattern C in the segment 511 and another pattern D in a segment 512 can not be effected. As a result, an improper or unsuitable patterning may be performed, reducing the yield of the semiconductor IC devices.

Figure 2A:
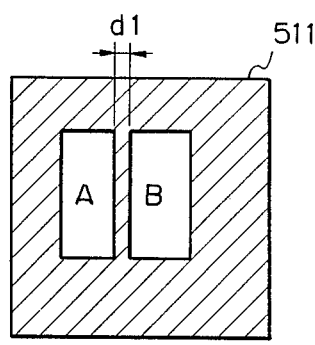
FIGS. 2a and 2b, 3a and 3b, 4, 5a, 5b and 5c, and 6 are explanatory views illustrating the pattern rule check.

Certain pattern layout data can be used for a plurality of pattern exposure optical systems, but the resolutions of these optical systems may be different. Accordingly, the pattern rule check must be made to make the resolutions of the optical systems compatible. More concretely, if a design distance d1 between two adjacent patterns A and B is 1 μm as shown in FIG. 2a, and the actual distance displayed on the CRT display is 0.8 μm, the actual distance is permissible for an optical system having a resolution of 0.7 μm, but conversely, is not acceptable for an optical system having a resolution of 0.9 μm. Accordingly, the pattern layout data for the latter optical system must be adjusted to be greater than 0.9 μm. This adjustment, however, can not be easily and effectively achieved by the conventional exposure pattern data inspection system, due to a low operation speed and the lack of, or no provision for effective functions, etc.

Namely, more inspection functions are required.

Figure 3A:
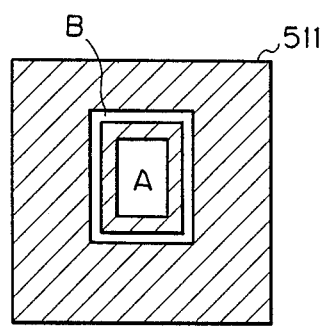
Figure 3B:
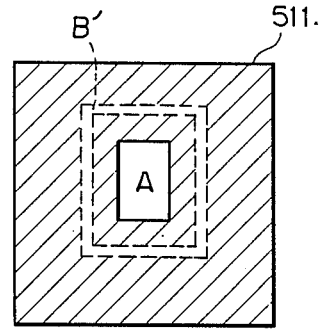

One of these additionally-required functions is the expansion and contraction function. Namely, when adjustment of the pattern is required, the expansion of a pattern B, for example, having a distance of 10 μm from a pattern A as shown in FIG. 3a, to a pattern B' having, for example, a distance of 15 μm from the pattern A as shown in FIG. 3b, or vice versa, may be required. The conventional exposure pattern data inspection system, however, does not substantially provide this function.

Figure 4:
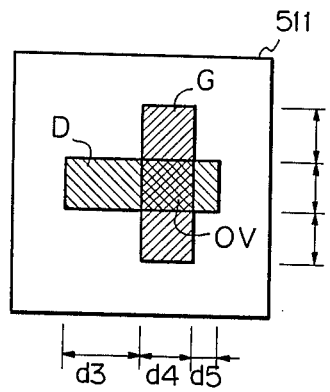

Another of these additionally-required functions is a pattern rule check for a plurality of layers. For example, inspection of the size of an overlapped portion OV of a drain pattern D of one layer and a gate pattern G of another layer, and the distance d3 to d5 as shown in FIG. 4, may be required. This check cannot be substantially made by the conventional exposure pattern data inspection system.

Figure 5A:
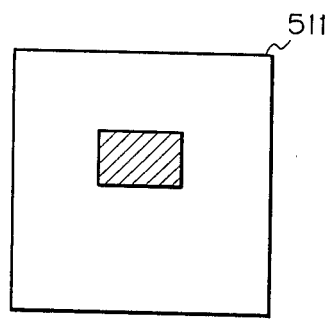
Figure 5B:
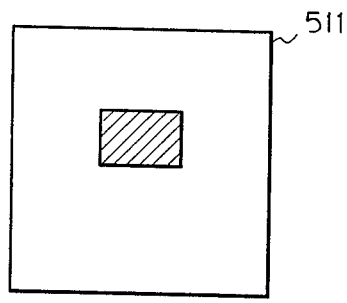
Figure 5C:
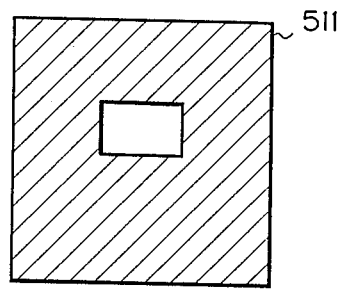

In accordance with a photoresist grade, a positive pattern, as shown in FIG. 5b for a positive photoresist or a negative pattern, as shown in FIG. 5c, for a negative photoresist is required. When the negative pattern is required, an inversion of the pattern of an originally designed pattern, as shown in FIG. 5a, must be effected, but this inversion cannot be substantially provided by the conventional exposure pattern data inspection system due to a low speed and a lack of a program function therefor.

Figure 6:
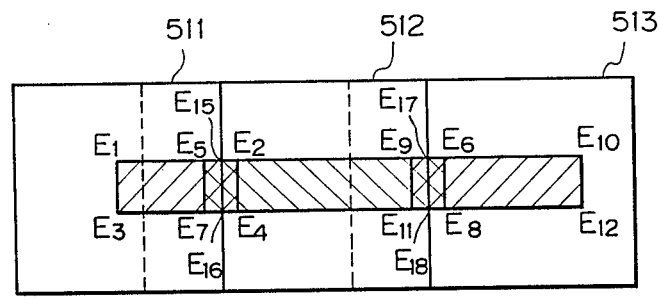

When patterning is made to provide a pattern over a plurality of segments, for example, a pattern E over the segments 511 to 513 as shown in FIG. 6, pattern data $(E_1, E_2, E_3, E_4)$, $(E_5, E_6, E_7, E_8)$, and $(E_9, E_{10}, E_{11}, E_{12})$ is produced to prevent pattern discontinuities at boundaries of the adjacent segments between 511 and 512, and between 512 and 513. In the conventional exposure data inspection system, however, the overlapped portions $(E_5, E_{15}, E_7, E_{16})$ in the segment 511, $(E_{15}, E_2, E_{16}, E_4)$ and $(E_9, E_{17}, E_{11}, E_{18})$ in the segment 512, and $(E_{17}, E_6, E_{18}, E_8)$ in the segment 513 are regarded as improper data.

The preferred embodiments of the present invention will now be described.

Figure 7:
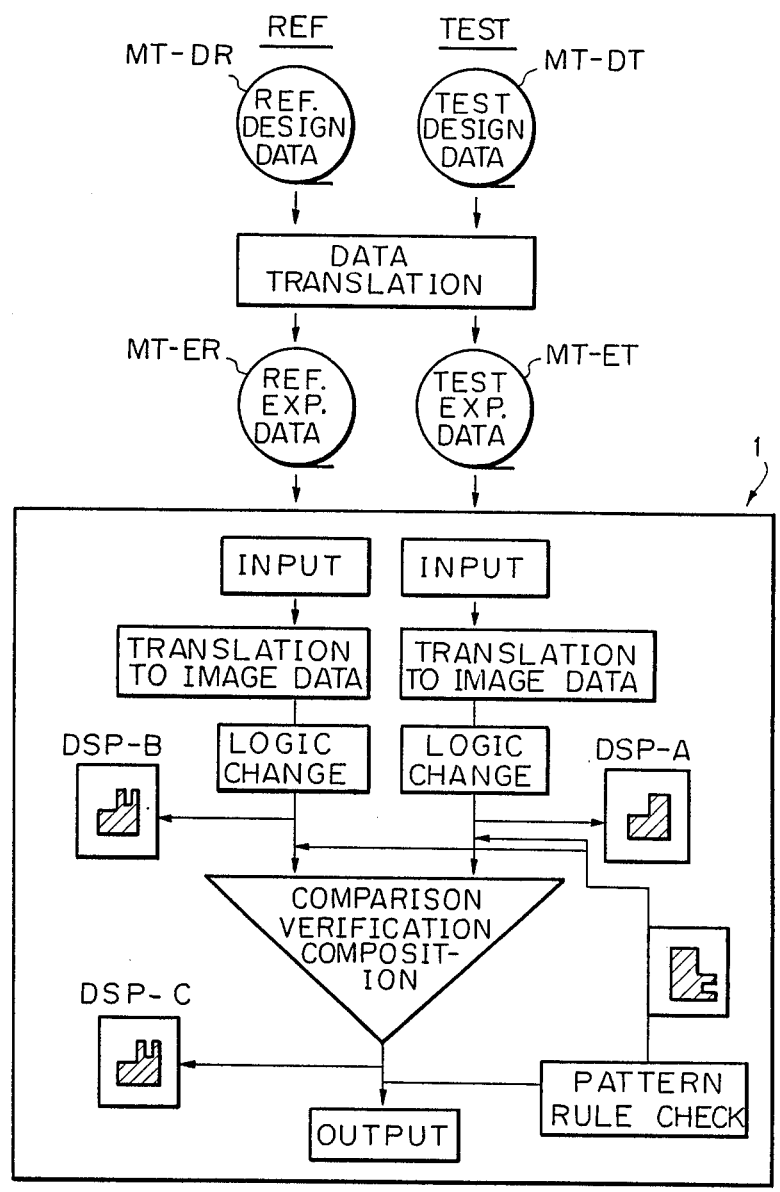
FIG. 7 is a block diagram showing an outline of an exposure pattern data inspection system of the present invention.

FIG. 7 is a block diagram representing a configuration of the present invention. Referring to FIG. 1, a magnetic tape MT-DR storing reference design pattern data and another magnetic tape MT-DT storing test pattern data are prepared. The reference design pattern data includes design pattern data previously designed and produced and used as a reference pattern. The test pattern data includes design pattern data newly produced for modifying patterns with reference to the reference design pattern data, and to be inspected. The pattern data to be stored in the magnetic tapes MT-DR and MT-DT is formed by, for example, the CV format or CALMA format.

The pattern data stored in the magnetic tapes MT-DR and MT-DT is outline data produced on the basis of the coordinate data, and accordingly, a data translation of the pattern data stored in the magnetic tapes MT-DR and MT-DT to data compatible with the exposure to produce reticles is performed prior to the inspection. The translated reference and test exposure data is stored in magnetic tapes MT-ER and MT-ET, respectively.

An inspection system 1 for inspecting exposure pattern data of the present invention can be used to inspect and adjust the exposure data prior to the production of the reticles. An outline of the exposure pattern data inspection system 1 is given as follows: the exposure data is input from the magnetic tapes MT-ER and MT-ET, the input exposure data is translated into image data, the translated exposure data is displayed on display units DSP-A and DSP-B, the translated exposure data is processed according to the process requested, (such as comparison, verification, composition) the process results are displayed on a display unit DSP-C, the process results are checked on the basis of predetermined pattern rules, and the checked results are then output.

The exposure pattern data inspection system 1 will now be more specifically described with reference to FIGS. 8a and 8b.

Figure 8B:
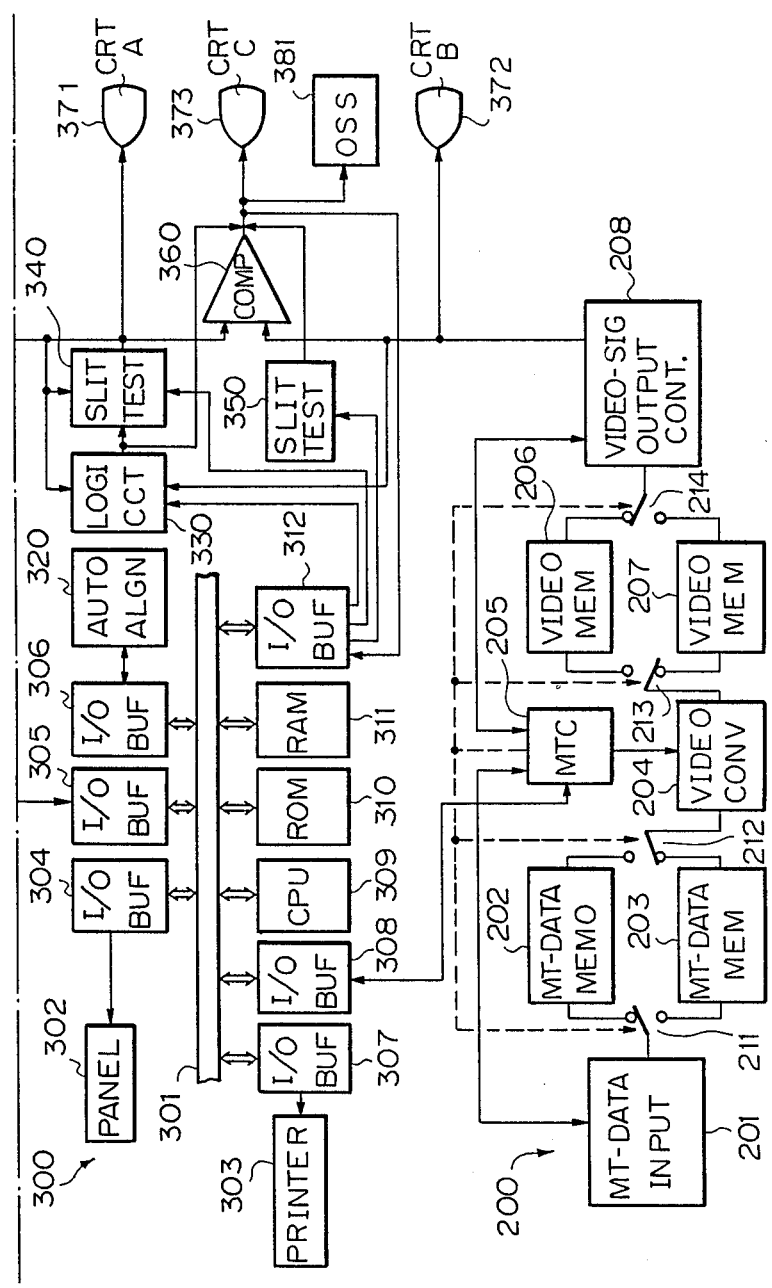

Referring to FIGS. 8a and 8b, the exposure pattern data inspection system 1 includes a first data input and signal translation unit 100, a second data input and signal translation unit 200, and an arithmetic and control unit 300. The first data input and signal translation unit 100 inputs the test exposure pattern data from the magnetic tape MT-ET and translates the input data into image data in the form of a video signal. Additionally, the second data input and signal translation unit 200 inputs the reference exposure pattern data from the magnetic tape MT-ER and also translates the input data into image data in the form of a video signal.

The data input and signal translation unit 100 consists of a magnetic tape data input circuit 101 for inputting the test exposure pattern data from the magnetic tape MT-ET, a switch 111, and magnetic tape data memories 102 and 103. The data input and signal translation unit 100 also consists of a switch 112, a video signal conversion circuit 104, translating the exposure pattern data into pattern data in the form of a video signal, a switch 113, video data memories 106 and 107 storing the video pattern data therein, a switch 114, and a video signal output control circuit 108. The data input and signal translation circuit 100 further includes a magnetic tape control circuit 105, operatively connected to the arithmetic and control unit 300 and totally controlling the above circuit operation. The video signal output control circuit 108 is also connected to the arithmetic and control unit 300. The data input and signal translation circuit 100 includes dual magnetic tape data memories 102 and 103, dual video data memories 106 and 107, and switches 111 to 114 for selectively changing the data input to or output from these memories, and thus is constructed as a dual system to improve the data processing time.

The data input and signal translation unit 200 has the same circuit construction as the data input and signal translation unit 100, and accordingly, a description thereof is omitted.

The arithmetic and control unit 300 includes: a central processor unit (CPU) 309 of a small computer; a bus 301 connected thereto; a read-only-memory (ROM) 310, operatively connected to the CPU 309 and loading programs therein; an operation panel 302, operatively connected to the CPU 309 through an input and output (I/O) buffer 304; and a printer 303, operatively connected to the CPU 309 through an I/O buffer 307. The arithmetic and control unit 300 also includes a random access memory (RAM) 311 storing, for example, faulty coordinate data. The arithmetic and control unit 300 further includes an automatic data alignment circuit 320, connected to the CPU 309 through an I/O buffer 306, and a logic arithmetic circuit 330 and slit test circuits 340 and 350, respectively connected to the CPU 309 through an I/O buffer 312. Furthermore, the arithmetic and control unit 300 includes a comparator circuit 360 and CRT display units 371, 372 and 373. An oscilloscope 381 can be connected in parallel to the CRT display unit 373 for observing the original video signal. The CPU 309 is connected to the magnetic tape control units 105 and 205 through I/O buffers 305 and 308, respectively.

Referring to FIGS. 9a to 9e, the operation of the data input and signal translation unit, 100, will be described.

Figure 9A:
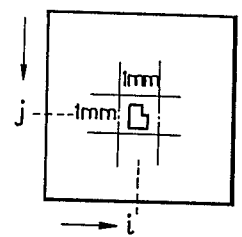

FIG. 9a is a visual representation of the exposure pattern data saved in the magnetic tape MT-ET in a two-dimensional right angle coordinate system. The drawing corresponds to FIG. 1b. The size of each segment is 1 mm × 1 mm, and the resolution is 1 $\mu$m × 1 $\mu$m. Here, an enormous memory capacity and a very long translation time are required to input and to translate all of the exposure pattern data in the magnetic tape MT-ET at one time. The inspector then specifies a center segment defined by indices i and j, where i indicates a row number and j a column number, of a region to be inspected by the panel 302. The inspector's request is transmitted to the magnetic tape control unit 105 through the CPU 309, and the magnetic tape data input circuit 101 reads the exposure pattern data in the magnetic tape MT-ET in response to that request. The read exposure pattern data may be for a single segment of the indices i and j or a plurality of segments of the indices $(i-1, j-1)$, $(i-1, j)$, $(i-1, j+1)$, $(i, j-1)$, $(i, j)$, $(i, j+1)$, $(i+1, j-1)$, $(i+1, j)$ and $(i+1, j+1)$.

Figure 9B:
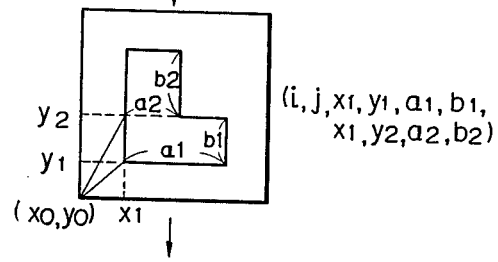

FIG. 9b is an enlarged view of the exposure pattern data in the segment (i, j) in FIG. 9a. The exposure pattern data includes the indices i and j, and coordinate data $x_1$, $y_1$; $a_1$, $b_1$; $x_1$, $y_2$; and $a_2$, $b_2$. In FIG. 9b, reference symbols $x_0$ and $y_0$ represent reference points of the coordinate. Namely, $x_0$ indicates an absolute coordinate of an X-axis from an origin in FIG. 9a, and $y_0$ indicates an absolute coordinate of a Y-axis from that origin. The coordinates $(x_1, y_1)$ and $(x_1, y_2)$ are distances from the reference coordinate $(x_0, y_0)$; references $a_1$ and $a_2$ are lengths from the point $x_1$ in the X direction; and references $b_1$ and $b_2$ are lengths from the points $y_1$ and $y_2$ in the Y direction. The parameters relevant to the coordinate are set by a resolution of 1 $\mu$m.

Figure 9C:
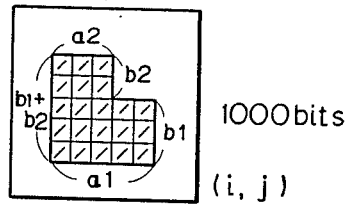

FIG. 9c is a view representing the status of the above data store in the magnetic tape data memories 102 and 103. The switches 111 to 113 are controlled by the magnetic tape control circuit 105, to realize the buffering data processing. For example, a predetermined amount of the exposure pattern data from the magnetic tape data input circuit 101 is stored in the magnetic tape data, memory 102 by selecting the switch 111 as shown in FIG. 8a. As the magnetic data memory 102 becomes full, the switch 111 is changed to make a connection between the magnetic tape data input circuit 101 and the magnetic tape data memory 103, to load the exposure pattern data into the magnetic tape data memory 103. The switches 112 and 113 are also energized to make a connection between the magnetic tape data memory 102 and the video signal conversion circuit 104, and between the video signal conversion circuit 104 and the video data memory 106. While the exposure pattern data is loaded into the magnetic tape data memory 103, the stored exposure pattern data in the magnetic tape data memory 102 is sequentially output to the video signal conversion circuit 104 through the switch 112, having the state shown by a dotted line, converted into a video signal, and stored in the video data memory 106 through the switch 113 having the state shown by a dotted line. The above operation can be alternatively effected.

Figure 9D:
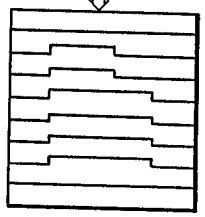

The video signal conversion circuit 104 generates data corresponding to the actual patterning figure as shown in FIG. 9d, and having the resolution of 1 μm on the basis of the coordinate data as shown in FIG. 9c, and sends the same to the video data memories 106 and 107. More specifically, data set by a logical "1" in the video data memories 106 and 107 is actually patterned.

The video signal output control circuit 108 scans the data stored in the video data memory 106 or 107 in a horizontal direction, in synchronization with a clock signal (not shown) supplied from the magnetic tape control circuit 105, and outputs a high level signal when the data is a logical "1". If the data is not logical "1", a low level signal is output. The above horizontal scanning is consecutively performed in a vertical direction. FIG. 9e is a view of the video signals generated at the video signal output control circuit 108 and corresponding to the data shown in FIG. 9d.

The above data read and translation is executed by a true hardware circuit having an optimum configuration for executing the above operation, instead of the conventional system of the combination of the general purpose computer and the programs, and consequently, the operation time for this process is greatly shortened.

Figure 2B:
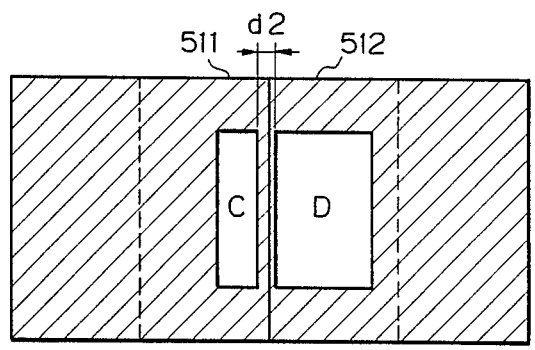

The exposure pattern data to be inspected and to be displayed on the CRT at one time is data of at least one segment. Accordingly, a memory capacity obtained by combining the video data memories 106 and 107 must be 1000 bits (=1 mm/1 μm)×1000 bits (=1 mm/1 μm), i.e., at least one mega bits. To inspect the pattern as shown in FIG. 2b, preferably a two mega bits memory capacity, i.e., one mega bits for the video data memory 106 and another one mega bits for the video data memory 107, should be provided. The above is a simple estimation, and a memory capacity of only one mega bits obtained by combining the video data memories 106 and 107 may be sufficient to inspect the pattern as shown in FIG. 2b. The latter operation will be described later.

The memory capacities of the magnetic tape data memories 102 and 103 and the video data memories 106 and 107, which are used for temporary data storage, are defined by the data input speed and data translation speed, etc.

Figure 10:
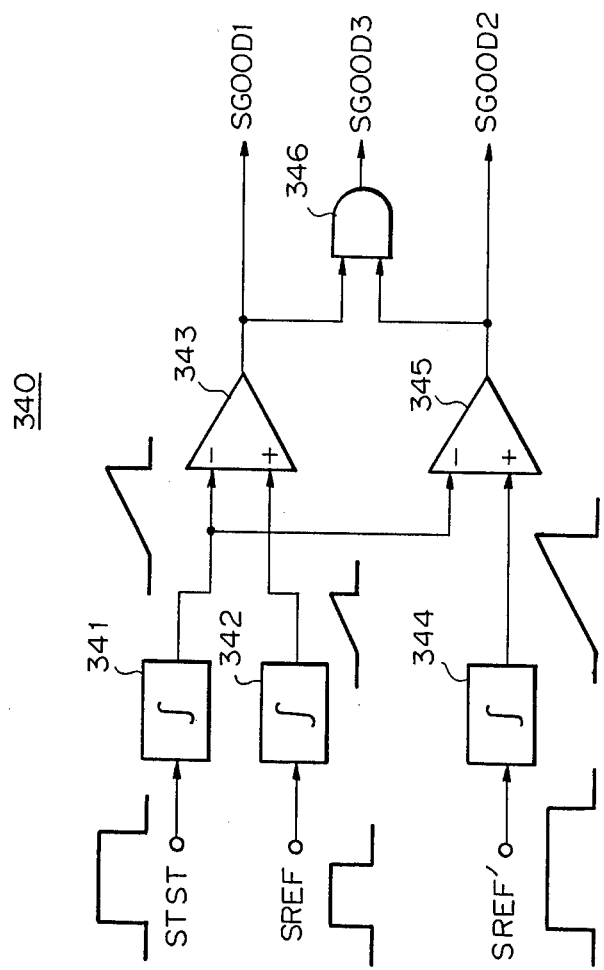
FIG. 10 is a circuit diagram of the slit test circuit shown in FIG. 9b.
Figure 11:
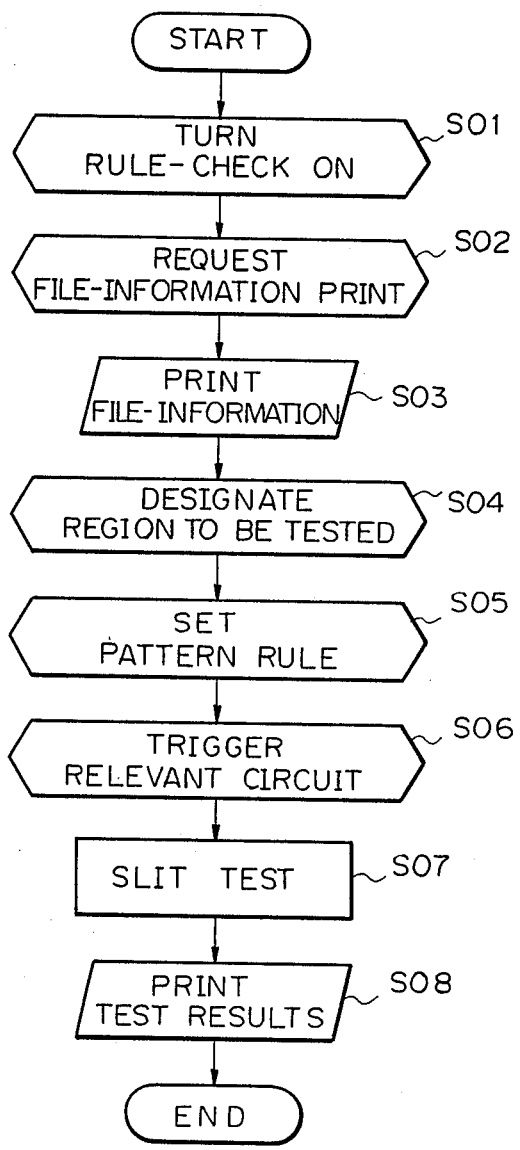
FIG. 11 is a flow chart explaining the operation of the slit test of the exposure pattern data inspection system shown in FIGS. 8a and 8b.
Figure 12A:
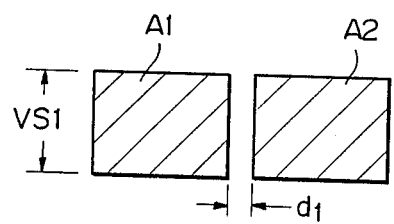
FIGS. 12a and 12b explanatory views illustrating the slit test by the exposure pattern data inspection system shown in FIGS. 8a and 8b.
Figure 12B:
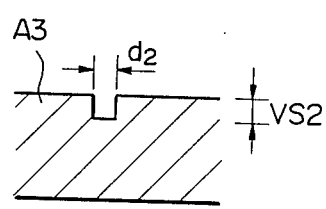

A description of a slit inspection of the exposure pattern data of a single layer will be made with reference to FIGS. 10, 11, and 12a and 12b. FIG. 10 is a circuit diagram of the slit test circuit 340; FIG. 11 is a flow chart, explaining slit inspection; and FIGS. 12a and 12b are explanatory views of patterns to be inspected.

Referring to FIG. 10, the slit test circuit 340 includes: a first integrator 341 for receiving and integrating the test exposure pattern signal STST to be tested, in the form of a video signal as shown in FIG. 9e, from the video signal output control circuit 108; a second integrator 342 for receiving and integrating a reference slit signal SREF; and a comparator 343 for receiving and comparing the integrated voltage signals from the integrators 341 and 342. When the test exposure pattern signal STST is greater than the reference signal SREF, the comparator 343 outputs a high level signal SGOOD1. The slit test circuit 340 may include a third integrator 344 for receiving and integrating another reference slit signal SREF', and a second comparator 345 receiving the integrated voltage signals from the integrators 341 and 344 and outputting a second high level signal SGOOD2 when the reference slit signal SREF' is greater than the test exposure pattern signal STST. The slit test circuit 340 may further include an AND gate 346 receiving the high level signals SGOOD1 and SGOOD2 and outputting a third high level signal SGOOD3 when both of the signals SGOOD1 and SGOOD2 are high level. As described above, the first high level signal SGOOD1 indicates that the test exposure pattern signal STST is greater than the first reference slit signal SREF, the second high level signal SGOOD2 indicates that the second reference slit signal SREF' is greater than the test exposure pattern signal STST, and the third high level signal SGOOD3 indicates that the test exposure pattern signal STST lies between the reference slit signals SREF and SREF'. The first to third high level signals SGOOD1 to SGOOD3 may be selectively used in response to a grading of the inspection.

The slit test circuit 350, shown in FIG. 8b, has a circuit construction similar to the above, and thus a description thereof is omitted.

The operation of the slit inspection will be described with reference to FIG. 11.

Step 01 (S01)

The inspector (or operator) depresses a "RULE-CHECK ON" push button switch (PBS) on the operator panel 302 to initiate the slit inspection operation.

Step 02 (S02)

The inspector sets the magnetic tape MT-ET storing the test exposure pattern data to a magnetic tape system (not shown), and then depresses a "FILE PRINT REQUEST" PBS on the operator panel 302.

Step 03 (S03)

The CPU 309 reads a file data including information for specifying inspecting regions, such as series numbers and indices of the segments, from the magnetic tape MT-ET through the magnetic tape system, the magnetic tape data input circuit 101 connected thereto, the magnetic tape control unit 105 and the I/O buffer 305.

The CPU 309 prints out the read file data at the printer 303 through the I/O buffer 307.

Step 04 (S04)

The inspector determines a region to be tested on the basis of the printed-out data and sets the same through the operator panel 302.

Step 05 (S05)

Thereafter, the inspector sets a pattern rule through the operator panel 302. The pattern rule is, for example, as follows:

(a) test within 4 μm at a five times expansion, or (b) test within 7 μm at a ten times expansion.

Step 06 (S06)

Subsequently, the CPU 309 substantially triggers the data input and signal translation unit 100, the slit test circuit 340, and the CRT display unit 371.

Step 07 (S07)

The slit test is executed by the following steps:

(a) The data input and signal translation unit 100 reads corresponding exposure pattern data designated by the inspector, from the magnetic tape MT-ET, converts the read exposure pattern data to patterning exposure data and saves the same in the video data memories 106 and 107, as described above with reference to FIGS. 9a to 9d.

(b) The video signal output control circuit 108 sequentially generates the video signals as shown in FIG. 9e on the basis of the converted data stored in the video data memories 106 and 107, and outputs the generated video signals to the CRT display unit 371 and the slit test circuit 340.

(c) The CRT display unit 371 displays the received video signals as shown in FIG. 12a. The displayed figure is enlarged to enable an easy visualization and recognition of the resolution of 1 μm by the naked eye, specifically, at least one dot of the display unit corresponding to 1 μm. In this example, the pattern is of a single layer and of a single segment of the wafer.

Simultaneously, the slit test circuit 340 shown in FIG. 10 receives the video signals to be tested, from the video signal output control circuit 108 at the input of the integrator 341, and receives the reference slit signal having a pulse width defined by the designated rule check data. A slit d1 between patterns A1 and A2 is checked to determine whether or not the slit d1 is greater than the reference slit. The check is executed at the resolution of 1 μm. The slit check is carried out from top to bottom in a vertical direction in FIG. 12a. If any slit in the vertical direction is smaller than the reference slit, the high level signal SGOOD1 from the comparator 343 falls at the corresponding line. The CPU 309 inputs the high level signal SGOOD1 synchronously with the advance of the vertical line and saves fault statuses in the RAM 311.

The slit test can be effected to check whether the slit d1 is smaller than the reference slit SREF', and to check whether the slit d1 lies between the reference slits SREF and SREF', by using the integrator 344, the comparator 345, and the AND gate 346 shown in FIG. 10.

For the above check, a span VS1 to be checked is previously set, and accordingly, the above check is performed at the span VS1.

Step 08 (S08)

Upon completion of the above slit check, the CPU 309 outputs the results of the check, stored in the RAM 311, at the printer 303. The test results also can be displayed on the CRT display unit 371. Thereafter, the check operation is terminated.

If the check for another area in the same segment as that for which the exposure data is converted and stored in the video data memories 106 and 107, is to be effected, the inspector can repeat the operation from step S04. FIG. 12b is another pattern view for a test of a slit d2 of a pattern A3 for a span VS2. This pattern check can be performed in a similar way to that mentioned above.

If a check for another segment is required, the inspector must start from step S01.

The above slit test can be performed for the reference exposure pattern data, stored, in the magnetic tape MT-ER.

Next, another pattern test will be described. In this test, the revised exposure pattern data in the magnetic tape MT-ET is compared with the reference exposure pattern data which is the original pattern data in the magnetic tape MT-ER.

Figure 13A:
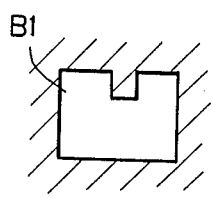
FIGS. 13a, 13b and 13c are views illustrating the pattern comparison test by the exposure pattern data inspection system shown in FIGS. 8a and 8b.
Figure 13B:
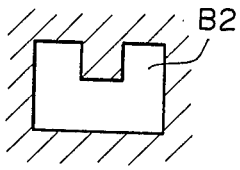
Figure 13C:
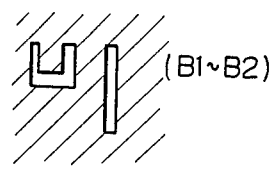
Figure 16:
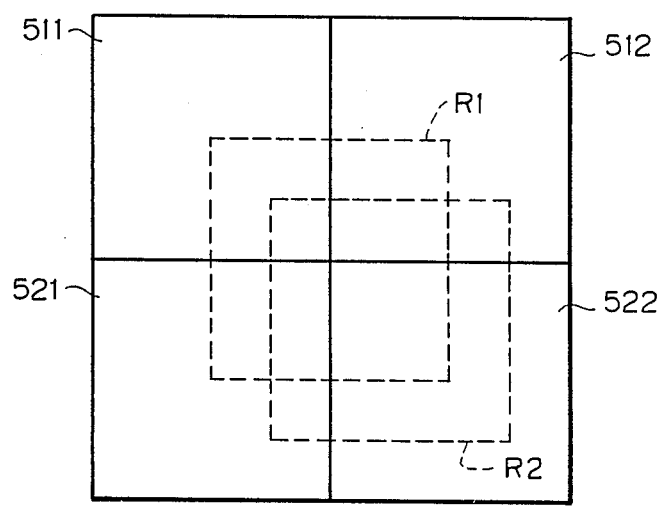
FIG. 16 is a view for designating a test region having a plurality of segments.

The standard operation as shown in FIG. 11 is applied to the pattern test. The data input and signal translation unit 200 reads corresponding reference exposure pattern data designated by the inspector from the magnetic tape MT-ER, converts the read data to the patterning data, and outputs the video signals to the CRT display unit 372 and the comparator 360. Simultaneously, the data input and signal translation unit 100 reads corresponding revised exposure pattern data from the magnetic tape MT-ET, converts the read data to the patterning data, and outputs the video signals to the CRT display unit 371 and the comparator 360. As a result, the reference patterning figure and the revised patterning figure are displayed on the CRT display units 371 and 372, as shown in FIGS. 13a and 13b. At the comparator 360, the pattern data from the video signal output control circuits 108 and 208 are compared in the form of a video signal and differences therebetween are extracted and displayed on the CRT display unit 373, as shown in FIG. 13c. By observing the CRT display units 371, 372, and 373, the inspector can easily verify the revision of the pattern data in the magnetic tape MT-ET.

The differences from the comparator 360 can be read at the CPU 309 through the I/O buffer 312 and can be printed out at the printer 303.

The differences between both exposure pattern data can be observed by an oscilloscope 381 connected to the comparator 360.

With respect to the verified revised exposure pattern data, the slit test as described above also can be carried out.

A pattern test of the logically processed exposure pattern data will be described. This kind of pattern test may be carried out as follows:

(a) the exposure pattern data is inverted, as shown in FIG. 5a to 5c, (b) added portions and removed portions of the differences between two exposure pattern data, for example, the reference and revised pattern data, as shown in FIGS. 13a to 13c are discriminated, and (c) a test is carried out to detect whether or not there are overlapping portions of a plurality of layers, and at a same region in a plan, as shown in FIG. 4.

The logic arithmetic circuit 330 includes OR gates, AND gates, EXCLUSIVE-OR gates, inverters, and other logic circuits, which are operatively connected to the video signal output control circuits 108 and 208, the slit test circuit 340 and the CRT display unit 373, under control of the CPU 309. The logic circuits in the logic arithmetic circuit 330 can be connected in any combination in response to a request from the inspector. Typical logic arithmetic operations are as follows:

(a) As shown in FIG. 14c, an exclusive-OR A+B of a pattern A, as shown in FIG. 14a, and a pattern B, as shown in FIG. 14b, (b) As shown in FIG. 14d, a logical-OR of the pattern A as shown in FIG. 14a and the pattern B as shown in FIG. 14b, (c) As shown in FIG. 14e, a logical-OR of the pattern A as shown in FIG. 14a and an inverted pattern $\bar{B}$, or vice versa, (d) As shown in FIG. 14f, a logical-AND of the pattern A as shown in FIG. 14a and the pattern B as shown in FIG. 14b, (e) As shown in FIG. 14g, a logical-AND of the pattern A as shown in FIG. 14a and an inverted pattern $\bar{B}$, or vice versa, (f) As shown in FIG. 5c, a simple inversion of the pattern of FIG. 5a, and (g) As shown in FIG. 5b, a re-inversion of the pattern of FIG. 5a.

In the above, the patterns A and B can be arbitrarily selected. For example, the pattern A can be the test exposure pattern data and the pattern B can be the reference pattern data. In another example, the pattern A can be a first layer exposure pattern data and the pattern B can be a second layer exposure pattern data in a same segment.

The above arithmetic calculated values are displayed on the CRT display unit 373 and can be printed out. In addition, the slit test can be carried out by the slit test circuit 340.

Through the above operations, a pattern check of the plurality of layers, pattern overlapping, pattern verification and pattern comparison, etc., can be achieved.

In the exposure pattern data inspection system, a set of the exposure pattern data corresponding to one segment with respect to a center of an arbitrary coordinate can be read through the magnetic tape data input circuit 101 and/or 201. When the inspector designates a test area as shown by a dotted line in FIG. 2b, the slit test of the patterns C and B lying between the segments 511 and 512 can be carried out. Other tests also can be effected.

Figure 15A:
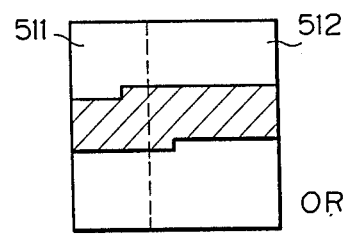
FIGS. 15a, 15b and 15c are views representing the test for overlapped patterns and the continuation of patterns.
Figure 15B:
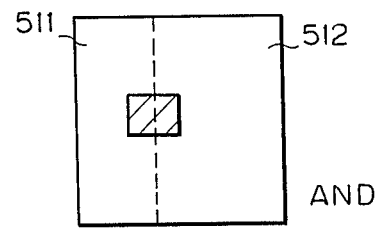
Figure 15C:
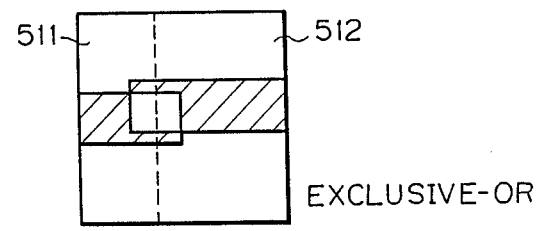

According to the above data processing, the test of the continuation of the pattern lying on the boundary of the segments 511 and 512, and the pattern lying on the boundary of the segments 512 and 513, particularly, the patterns at the overlapped sections of ($E_5$, $E_2$, $E_4$, $E_7$) and ($E_9$, $E_6$, $E_8$, $E_{11}$), as shown in FIG. 6 can be checked. More specifically, the data input and signal translation unit 100 reads the exposure pattern data at a region enclosed by a dotted line in FIG. 6 and lying between the segments 511 and 512. When the read and translated data in the segments 511 and 512 is subjected to an OR operation, a pattern as shown in FIG. 15a is obtained on the CRT display unit 373. When the data is subjected to an AND operation, another pattern as shown in FIG. 15b is obtained, and when the data is subjected to an exclusive-OR operation, still another pattern as shown in FIG. 15c is obtained.

In addition, test regions R1 and R2 lying on the segments 511, 512, 521 and 522 as shown by dotted lines in FIG. 1b can be tested.

The automatic data alignment circuit 320 is used together with the data input and signal translation units 100 and 200 for changing the exposure pattern data.

If the pattern B in FIG. 2a is to be shifted to the right for a predetermined distance, after the slit test for the raw exposure pattern data set forth above, the inspector designates the coordinate corresponding to the pattern B, the predetermined distance, and the direction to which it should be shifted. The automatic data alignment circuit 320 changes the location in the data stored in the video data memories 106, 107, 206 and 207, in response to the designated parameters, through the I/O buffers 305 and 308 and the magnetic tape control circuits 105 and 205. The above designation can be made by, for example, a joystick, a tracking ball, etc., as an input tool for the CRT display unit. The inspector can attempt a pattern check of the modified pattern, and finally, acknowledged patterns can be fed back to the source patterns stored in the magnetic tape MT-ET, thereafter.

By using the automatic alignment circuit 320, a pattern change, for example, from the pattern B in FIG. 3a to the pattern B' in FIG. 3b also can be effected. and a pattern shift of, for example, any one of the patterns D and G in FIG. 4, also can be effected.

In the above embodiments, the memory capacity of the video data memories 106 and 107 or 206 and 207 is one mega bits, for storing the exposure pattern data in a segment of 1 mm×1 mm with a resolution of 1 μm. If the resolution for storing the data into the video data memories is reduced to 2 μm, the exposure pattern data in four segments, for example, 511, 512, 521, and 522, can be stored. In this case, the test resolution is reduced by half. On the other hand, the memory capacity can be increased to four mega bits.

The data stored in the video data memory 106, 107, 206 or 207 can be freely output through the video signal output control circuit 108 or 208 with respect to a center designated by, for example, the joystick or the tracking ball. Accordingly, a so-called "scrawling" test and display can be realized.

The data stored in the video data memory 106, 107, 206 or 207 also can be enlarged for display on the CRT display unit(s) 371, 372, 373. This can facilitate a visual test of the CRT display unit(s) 371, 372, 373.

The above pattern tests are formed in exactly the same way as an actual reticle pattern formation, taking into consideration the actual optical systems. As a result, the reliability of the pattern tests by the exposure pattern data inspection system 1 is greatly increased.

The exposure pattern data inspection, basically performed by using properly adjusted hardware circuits, results in a great shortening of the operation time. Namely, compared with the conventional system, the time can be reduced to approximately one-fifth to one-tenth of that in the conventional system.

In the present exposure pattern data inspection system 1, the pattern check and display is performed by data in the form of video signals, to speed up the operation time.

According to the present invention, the exposure pattern data inspection system 1 is provided with many of the functions required for the pattern check and pattern adjustment, thus eliminating the defects of the conventional systems.

In the exposure pattern data inspection system 1 of the present invention, the data handling limitation by the segment in the conventional system is eliminated.

Many widely different embodiments of the present invention may be constructed without departing from the spirit and scope of the present invention. It should be understood that the present invention is not limited to the specific embodiments described in this specification, except as defined in the appended claims.

We claim:

1. A system for inspecting an exposure pattern data prior to formation of a reticle of a semiconductor integrated circuit device using said exposure pattern data, said system comprising:
   first means for inputting exposure pattern data in the form of coordinate data in response to a request for a test region, converting said input exposure pattern data to coordinate data corresponding to an actual pattern of a two-dimensional form, storing said converted data and outputting said stored data ina form of video signals,
   second means, operatively connected to said first means, for testing said exposure pattern data from said first means using said video signals and a predetermined pattern rule, said second means including at least one slit inspection circuit for comparing a pattern width of slits formed by said exposure pattern data in a designated section of said test region with a predetermined reference value; and
   third means, operatively connected to said second means, for outputting data tested by said second means.

2. An exposure pattern data inspecting system according to claim 1, wherein said second means further includes at least one logic circuit, connected to said first means and said slit inspection circuit, adjusting said exposure pattern data in a designated section within said test region.

3. An exposure pattern data inspecting system according to claim 1, wherein said first means inputs exposure pattern data for a plurality of layers of the test region, said second means testing patterns of said plurality of layers.

4. An exposure pattern data inspecting system according to claim 1, wherein said first means comprises two inputting and converting units operating independently of each other and having a same construction and connected to said second means, one inputting and converting unit inputting inspection exposure pattern data to be inspected and the other inputting and converting unit inputting reference exposure pattern data.

5. An exposure pattern data inspecting system according to claim 4, wherein said second means further comprises a comparator circuit, connected to said first means and said slit inspection circuit, comparing said inspection exposure pattern data and said reference exposure pattern data from said two inputting and converting units.

6. An exposure pattern data inspecting system according to claim 5, wherein said second means further comprises a logic circuit, connected to said first means and said slit inspection circuit, adjusting said exposure pattern data from said two inputting and converting units, prior to said comparison of said exposure pattern data.

7. An exposure pattern data inspecting system according to claim 4, wherein said second means further comprises a circuit combining said inspection exposure pattern data and said reference exposure pattern data from said two inputting and converting units.

8. An exposure pattern data inspecting system according to claim 7, wherein said second means further comprises a logic circuit, connected to said first means and said slit inspection circuit, adjusting said exposure pattern data from said two inputting and converting units, prior to said combination of said exposure pattern data.

9. An exposure pattern data inspecting system according to claim 1, wherein said first means inputs said exposure pattern data at a predetermined data input resolution, and said second means effects a test at a resolution defined by said predetermined data input resolution.

10. An exposure pattern data inspecting system according to claim 1, wherein said second means effects a test at a predetermined designated resolution.

11. An exposure pattern data inspecting system according to claim 1, wherein said first means comprises dual data storing units, connected to said second means, improving data input speed and data conversion speed.

12. An exposure pattern data inspecting system according to claim 1, wherein said third means comprises a cathod ray tube display unit, coupled to said second means, for visually inspecting said pattern test result.

13. An exposure pattern data inspecting system according to claim 12, wherein said third means is operatively connected to said first means, for outputting said exposure pattern data.

14. A system as recited in claim 1, wherein said predetermined reference value is changeable to any desired value.

15. A system for inspecting exposure pattern data for forming a reticle of a semiconductor integrated circuit device, said system comprising:
   first means for inputting exposure pattern data as coordinate data in response to a request for a test region, converting said input exposure pattern data to coordinate data corresponding to an actual pattern of a two-dimensional form, storing said converted data and outputting said stored data as video signals, said first means comprising first and second inputting and converting units identical and operating independently of each other, said first inputting and converting unit inputting a first exposure pattern data corresponding to a first layer of the semiconductor integrated circuit device, and said second inputting and converting unit inputting a second exposure pattern data corresponding to a second layer of the semiconductor integrated circuit device;
   second means, operatively connected to said first means, for testing said exposure pattern data from said inputting and converting means using said video signals and a predetermined pattern rule, said second means comprising combining circuit means for combining said first and second exposure pattern data from said first and second inputting and converting units and a slit test circuit for determining whether a slit pattern width of said combined exposure pattern data video signals is smaller than a predetermined reference value; and third means, operatively connected to said pattern testing means, for outputting data tested by said testing means.

16. An exposure pattern data inspecting system according to claim 4, wherein said combining circuit means tests said first and second exposure pattern data in any of the following test modes:
   (a) an exclusive OR of a first exposure pattern data and a second exposure pattern data,
   (b) a logical OR of said two exposure pattern data,
   (c) a logical OR of a first exposue pattern data and an inverted second exposure pattern data,
   (d) a logical AND of said two exposure pattern data,
   (e) a logical AND of a first exposure pattern data and an inverted second pattern data.

17. An exposure pattern data inspecting system according to claim 4, wherein said predetermined reference value can be changed to any value.

18. An exposure pattern data inspecting system according to claim 15, wherein said first means inputs said exposure pattern data with a predetermined data input resolution, and said second means effects a test at a resolution defined by said predetermined data input resolution.

19. An exposure pattern data inspecing system according to claim 15, wherein said second means effects a test at a predetermined designated resolution.

20. An exposure pattern data inspecting system according to claim 15, wherein said first means comprises dual data storing units connected to said second means, improving data input speed and data conversion speed.

21. An exposure pattern data inspecting system according to claim 15, wherein said third means comprises a cathode ray tube display unit connected to said second means, for visually inspecting said pattern test result.

22. An exposure pattern data inspecting system according to claim 21, wherein said third means is operatively connected to said first means, for outputting said exposure pattern data.

* * * * *

UNITED STATES PATENT AND TRADEMARK OFFICE
CERTIFICATE OF CORRECTION

PATENT NO. : 4,774,461

DATED : September 27, 1988

INVENTOR(S) : Matsui et al.

It is certified that error appears in the above-identified patent and that said Letters Patent is hereby corrected as shown below:

Col. 1, line 65, after "system" insert --having--.

Col. 3, line 11, "9b" should be --8b--;

line 15, after "12b" insert --are--.

Col. 6, line 34, after "unit" delete the ",".

Col. 12, line 6, "1b" should be --16--;

line 29, delete ".".

Signed and Sealed this

Twenty-first Day of February, 1989

Attest:

DONALD J. QUIGG

*Attesting Officer*  *Commissioner of Patents and Trademarks*